2,866,806
ESTER MANUFACTURE PROCESS

Francis X. Markley, Royal Oak, and Melvin L. Larson, Ferndale, Mich., assignors to Ethyl Corporation, New York, N. Y., a corporation of Delaware No Drawing. Application November 16, 1953
Serial No. 392,504

7 Claims. (Cl. 260—461)

This invention relates to a novel process of preparing esters of phosphorus acids, and more particularly to preparing esters of tri- and pentavalent phosphorus.

An object of this invention is to provide straight-forward, practical means for producing esters of phosphorous and phosphoric acids and the thio analogs thereof wherein the sulfur is joined to the phosphorus by a coordinate covalent bond. A further object of this invention is to provide a process for producing esters of phosphorous and phosphoric acids and the thio analogs thereof wherein each organic group in the ester contains at least one halogen atom.

We have made the unexpected discovery that cyclic carbonate esters of glycols, hereinafter referred to as carbonic acid esters of glycols, react with trihalophosphorus compounds such as $PX_3$, $POX_3$ and $PSX_3$, wherein X represents a halogen atom, to yield haloaliphatic esters of the corresponding phosphorus and phosphoric acids. The carbonic acid esters of glycols used in the process of our invention are obtained by methods well known to the art, as, for example, the reaction of ethylene oxide with carbon dioxide to produce ethylene carbonate, German Patent Number 740,366, September 2, 1943.

The carbonic acid esters of glycols employed in the present invention can be represented by the following general structural formulae:

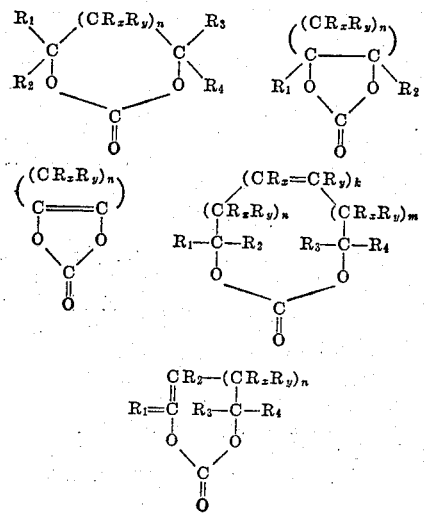

wherein $R_1$, $R_2$, $R_3$, $R_4$, $R_x$ and $R_y$ can be the same or different and where there is more than one $R_x$ in one formula each $R_x$ can be different from all the other $R_x$'s, and the same holds true for the $R_y$'s. The R's are chosen from the group consisting of hydrogen, alkyl, alkenyl, cycloalkyl and cyclo alkenyl groups, aryl and alphyl derivatives thereof and non-reactive halogen, nitrogen, oxygen and sulfur derivatives thereof. Non-limiting examples of alkyl groups are methyl, ethyl, propyl, isopropyl, butyl, and the like up to and including about eicosyl. Examples of alkenyl groups are 2-propenyl, 2-butenyl, 3-butenyl, the various straight and branched chain 2-pentenyl groups, and the like up to and including about eicosenyl as well as the various corresponding poly olefinic groups. Illustrative examples of cycloalkyl groups and cycloalkenyl groups are cyclohexyl, 3-cyclohexenyl, 4-cyclohexenyl, and the like. Non-limiting examples of aryl and alphyl derivatives of the above-mentioned groups are benzyl, phenylethyl, 3-phenylbutyl, tolylethyl, 3-tolylbutyl, naphthylethyl, and the like. All of the above groups can also have halogen substituents thereon as for example, chloroethyl, chloropropyl, bromophenylethyl, chloro-2-butenyl, and the like. The symbol $k$ can be zero, one, or multiples of one. The symbols $n$ and $m$ can vary from 0 to about 18, and the sum of $n+m+k$ appearing in the same formula is not greater than about 16. The total number of carbon atoms in the molecule can vary from 3 to about 38. Particularly favorable results are obtained when $m$ is equal to zero and $n$ is equal to zero or one. A non-limiting example of a preferred carbonic acid ester of glycol used in this invention is propylene carbonate. The above compounds react with the trihalophosphorus compounds with the evolution of $CO_2$ to yield the ester derivatives of the corresponding phosphorus and phosphoric acids wherein the halogen atom in the product is linked to that carbon of the organic group which is severed from the oxygen in the liberation of carbon dioxide. Non-limiting examples of the reactions may be represented by the following equations:

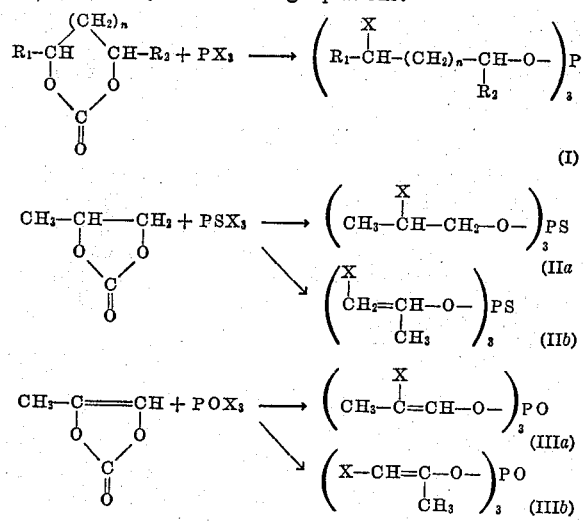

The $R_1$ and $R_2$ groups are interchangeable in the product Formula of I as written above since both isomers will be formed in the reaction. For the purpose of clarity, this invention relates to a novel process for preparing materials having the general formulae: $(RXO)_3P$, $(RXO)_3PO$, $(RXO)_3PS$, and shall be referred to in this application as tri-haloaliphatic phosphites, tri-haloaliphatic phosphates, and tri-haloaliphatic thionophosphates, respectively.

The process for preparing the tri-haloaliphatic phosphites, tri-haloaliphatic phosphates and tri-haloaliphatic thionophosphates of this invention comprises the reaction of a carbonic acid ester of a glycol and phosphorus trihalide, a carbonic acid ester of a glycol and a phosphoryl halide, a carbonic acid ester of a glycol and a thiophosphoryl halide, respectively. The reaction is evidenced by release of heat.

The products formed by the process are particularly suited for use as fuel additives, lubricating oil additives, flameproofing agents, chemical intermediates and the like. The unsaturated species of the product formed by our process can be used as polymer monomers, plasticizers, and the like.

In bringing together the reagents used in our novel process, the order of addition of reactants is not critical, that is, the carbonic acid ester of a glycol can be added to the trihalophosphorus compound or vice versa. A typical method is the addition of the carbonic acid ester of a glycol to the trihalophosphorus compound. The trihalophosphorus compound can be previously heated to the reaction temperature and the carbonic acid ester of a glycol added at such a rate as to maintain the exothermic reaction at a temperature at which the reaction proceeds smoothly at the desired rate. Conversely the trihalophosphorus compound can be added to the carbonic acid ester of a glycol. The following examples in which all parts and percentages are by weight illustrate one method effecting this novel process.

*Example I*

To a jacketed vessel provided with heat transfer means, means for returning reflux, means for introducing reactants and providing agitation, is added 137 parts of phosphorus trichloride. The temperature is increased to between 60 and 68° C., and 310 parts of propylene carbonate is introduced with agitation at such a rate as to maintain the temperature of the exothermic reaction at about 80° C. Upon completion of the addition of propylene carbonate heat is supplied for an additional period of twenty minutes to keep the temperature at 60° C. After this period the temperature of the reaction product is reduced to about 25° C. The excess propylene carbonate is removed by fractional distillation at a reduced pressure. The reaction product consists of tri($\beta$-chloropropyl) phosphite in high yield. Chemical analysis shows this compound contains 10 percent phosphorus and 34.1 percent chlorine, corresponding to the formula, $C_9H_{18}Cl_3O_3P$.

*Example II*

To the apparatus described in Example I is added 77 parts of phosphoryl chloride. The temperature of this mixture is increased to between 60 and 68° C., and 157 parts of propylene carbonate is introduced in small portions with constant agitation so as to maintain the temperature of the reaction below 80° C. After addition is complete the temperature is maintained at about 70° C. by supplying heat for an additional twenty minutes. The reaction product is next allowed to cool to 25° C. The excess propylene carbonate is removed by fractional distillation at a reduced pressure. The product obtained in high yield is tri($\beta$-chloropropyl) phosphate. This product is found by chemical analysis to contain 9.5 percent phosphorus and 32.5 percent chlorine corresponding to the formula, $C_9H_{18}Cl_3O_3PO$.

*Example III*

Using the procedure of Example II and substituting thiophosphoryl chloride for phosphoryl chloride, the resulting product is tri($\beta$-chloropropyl) thionophosphate having an index of refraction $n_D^{21.5}$ 1.4916. This product is found by chemical analysis to contain 9.02 percent phosphorus, 9.3 percent sulfur and 31.4 percent chlorine corresponding to the formula, $C_9H_{18}Cl_3O_3PS$. The product distills by a simple one-plate distillation at a temperature of from 140 to 160° C. at a pressure of one millimeter of mercury.

*Example IV*

To the apparatus described in Example I is added 170 parts of thiophosphoryl chloride. The temperature of the vessel and contents is increased to between 60 and 70° C., and 320 parts of 1,3-trimethylene carbonate is introduced slowly, with constant agitation, in small portions so as to maintain the exothermic reaction at a temperature of about 80° C. After the 1,3-trimethylene carbonate has been added the temperature is kept at 65° C. for an additional period of about thirty minutes by supplying heat. The reaction product is then allowed to cool to about 25° C. The excess 1,3-trimethylene carbonate is removed by fractional distillation at reduced pressure. The product consists of tri(chloropropyl) thionophosphate in high yield. The chemical analysis of the compound shows it to contain 9.04 percent phosphorus, 9.07 percent sulfur, and 30.9 percent chlorine, corresponding to a formula of $C_9H_{18}Cl_3O_3PS$.

The product of Example III can also be obtained by reacting propylene carbonate with a mixture of phosphorus trichloride and sulfur. An illustrative example is given herein below.

*Example V*

To a jacketed vessel described in Example I is added 32 parts of elemental sulfur as a suspension in 137 parts of phosphorus trichloride. The temperature of this mixture is increased to between 60° and 68° C., and 320 parts of propylene carbonate is introduced with constant agitation at such a rate as to maintain the exothermic reaction at a temperature of about 80° C. Upon completion of the addition of propylene carbonate the temperature is kept at 60° C. by supplying heat for an additional period of thirty minutes. Following this period the temperature of the reaction product is slowly reduced to about 25° C. and the mixture filtered. From the filtrate so-obtained, excess propylene carbonate is removed by conventional means such as, for example, fractional distillation at reduced pressure. The residue is tri($\beta$-chloropropyl) thionophosphate in high yield. This product is found by chemical analysis to contain 9 percent phosphorus, 9.10 percent sulfur, 31.6 percent chlorine, corresponding to the formula, $C_9H_{18}Cl_3O_3PS$. The product has an index of refraction $n_D^{21.5}$ 1.4912 and distills by simple one-plate distillation at a temperature of 140 to 160° C., and a pressure of one millimeter of mercury.

A variation of the above procedure is to introduce into the reaction vessel the desired quantity of phosphorus trihalide and then add thereto a mixture of a carbonic acid ester of a glycol and sulfur in the requisite proportions. Still another means of operation consists of premixing the necessary proportions of a carbonic acid ester of a glycol and sulfur and then introducing thereto phosphorus trihalide in incremental proportions. The process can be adapted either to batch or continuous operation.

Another method of obtaining tri($\beta$-chloropropyl) thionophosphate is to add sulfur to tri($\beta$-chloropropyl) phosphite after the latter has been formed. The following example illustrates this method.

*Example VI*

To the apparatus described in Example I is added 69 parts of phosphorus trichloride. The temperature of this component is raised to between 60 and 70° C., and 160 parts of propylene carbonate is introduced with constant agitation at such a rate as to maintain the exothermic reaction at a temperature below 80° C. Upon completion of the addition of propylene carbonate the temperature is kept at 60° C. by supplying heat for an additional period of thirty minutes. To the reaction product is then slowly added 16 parts of sulfur, making certain that the temperature of the reaction mass remains below 80° C. When the sulfur has all been added, sufficient heat is supplied to the reaction chamber for an additional period of thirty minutes to maintain the temperature at 60° C. The temperature is then slowly reduced to 25° C. and the mixture filtered. From the filtrate so-obtained, excess propylene carbonate is removed by fractional distillation at a reduced pressure. The product, tri($\beta$-chloropropyl) thionophosphate is obtained in high yield. The product is found by chemical analysis to contain 9.08 percent phosphorus, 9.20 percent sulfur and 31.8 percent chlorine, corresponding to the formula, $C_9H_{18}Cl_3O_3PS$.

The product has an index of refraction $n_D^{21.5}$ 1.4892 and distills by simple one-plate distillation at a temperature of 140 to 160° C. and a pressure of one millimeter of mercury.

In the last two examples given we can employ sulfur in an amount as low as one-half of one percent below the stoichiometric requirement. In this embodiment the slight excess of phosphorus trichloride employed appears to act as a catalyst for the reaction.

The sulfur employed in this process can be any of the various forms of the element. Generally speaking, ordinary commercial powdered sulfur is entirely suitable.

The reaction between a phosphorus trihalide and a carbonic acid ester of a glycol can be accomplished by using a mixture of various carbonic acid esters of glycols of the kind described elsewhere in this application. The product resulting therefrom will be a plurality of haloaliphatic esters of phosphorus acids, the ratio of the constituents being determined by the original proportions of the carbonic acid esters of glycols.

In the examples given above one or two of the reagents was placed in the reaction vessel, and another reagent added thereto. This procedure can be varied in many ways. For example, the several reactants can be concurrently introduced into the reaction vessel or reaction zone which is maintained at the reaction temperature. Other variations will be apparent to those skilled in the art.

In general we prefer to employ temperatures between about 30° C. to 90° C. Below about 30° C. the reaction is too slow to be practical and above 90° C. the exothermic reaction is more difficult to control. In each of the above illustrative examples as well as in our process in general for manufacturing the trihaloaliphatic phosphites, trihaloaliphatic phosphates and trihaloaliphatic thionophosphates, solvents can be employed. However, care should be taken that solvents so employed be inert to the reactants. Thus, organic solvents containing functional groups capable of reacting with the carbonic acid esters of glycols, the phosphorus trihalide, the phosphoryl halide, the thiophosphoryl halide or the products should be avoided, and in general anhydrous solvents are employed. Typical suitable solvents include aliphatic and aromatic hydrocarbons such as mineral oils, white oils, and chlorinated derivatives thereof, nitrobenzenes, ethers, and the like. One preferred method of controlling the above highly exothermic processes comprises conducting the reaction in a medium comprising the prouct. In general, the above process is advantageously conducted at prevailing atmospheric pressures. If, however, it is desirable to employ a volatile solvent, pressure can be employed in order to achieve the required reaction temperature.

The excess propylene carbonate was removed from the reaction product by fractional distillation at reduced pressures. In addition to this method, other conventional means of separation can be employed. One example is the hydrolysis of the carbonic acid ester of the glycol, which is propylene carbonate in this case, and subsequent separation by extraction of one of the components with a selective solvent. For example, the glycol resulting from the hydrolysis can be absorbed by water, and thus separated from the product.

The products of the reactions given in each of the above examples are water-white liquids and are stable under normal conditions of storage and exposure. It has been found that the above compounds, their individual isomers and mixtures thereof possess properties which make them very well suited for use as fuel additives as well as being useful for other purposes.

While the examples given above employ propylene carbonate and 1,3-trimethylene carbonate as reactants with phosphorus, trichloride, phosphoryl chloride, and thiophosphoryl chloride, other analogous reagents can be used. For example, phosphorus tribromide, phosphoryl bromide, thiophosphoryl bromide, phosphorus triiodide, phosphorus dichloride bromide, phosphoryl dibromide chloride, thiophosphoryl dichloride iodide, phosphorus diiodide chloride, phosphoryl bromide diiodide, thiophosphoryl diiodide bromide, phosphorus chloride bromide iodide, and the like, can be used in place of the corresponding chlorine derivatives of phosphorus. Also, the carbonic acid esters of glycols employed in reactions with the above-mentioned halophosphorus compounds can be any carbonic acid esters of suitable dihydroxy alcohols. Typical non-limiting examples of such esters are ethylene carbonate, propylene carbonate, 1,3-trimethylene carbonate; the carbonic acid esters of 1,3-dihydroxy butane, 1,4-dihydroxy butane, 2,3-dihydroxy butane; the carbonic acid esters of the various dihydroxy pentanes, dihyoxy hexanes, and the like. Examples of carbonic acid esters of cyclic glycols are the carbonic acid esters of 1,2-dihydroxy cyclohexane and the like. Typical examples of carbonic acid esters of unsaturated dihydroxy compounds are acetylene carbonate having the formula, $C_2H_2CO_3$; methyl acetylene carbonate having the formula, $CH_3C_2HCO_3$; 2-propenyl-ethylene carbonate, the carbonic acid ester of 1,4-dihydroxy butene-2, and the like.

Examples of unsaturated cyclic carbonates are carbonic acid esters of 3,4-dihydroxycyclohexene, 3,5-dihydroxycyclohexene, and the like. Any of the aforementioned compounds may have aryl and/or alphyl substituents thereon, as for example, phenylethylene carbonate, the various tolyl-propylene carbonates, the various tolyl-1,3-trimethylene carbonates, the various xylylbutylene carbonates, ethylphenyl acetylene carbonate, phenylcyclohexene carbonate, benzylcyclohexene carbonate, tolylcyclohexane carbonate, and the like. In addition the carbonic acid esters of glycols can have halogen substituents thereon such as chloroethylene carbonate, the various monochloropropylene carbonates, the various dichloropropylene carbonates, the various monobromopropylene carbonates, the various dibromopropylene carbonates, chloroacetylene carbonate, the various chloromethylacetylene carbonates, bromoacetylene carbonates, the various bromoethylacetylene carbonates, and the like. Other examples of straight and branched chain carbonates, cyclic carbonates, unsaturated branched and straight chain and cyclic carbonates and various aryl, alphyl, haloaryl, and halo derivatives thereof will be apparent to one skilled in the art.

The embodiment of our process in which the various unsaturated carbonic acid esters of glycols having carbon-to-carbon unsaturation therein are reacted with the various phosphorus halides leads to a new and extremely useful class of materials, namely, trihaloaliphatic esters of phosphorus acids in which the aliphatic groups have the carbon-to-carbon unsaturation. In the specific embodiment wherein vinylene carbonate is reacted with any of the phosphorus halides, esters containing the 2-chlorovinyl group are produced. This represents a new class of compopnds characterized by having carbon-to-carbon unsaturation of greater unsaturated stability due to the presence of vinyl halide linkage. In other embodiments such as the reaction of the cyclic carbonic acid ester of 1,2-epoxy pentene-4, products are produced in which a double bond is isolated from the chlorine atom. These new esters of phosphorus acids having haloaliphatic groups bearing carbon-to-carbon unsaturation find utility as monomers for homo- and copolymerization, as chemical intermediates such as for the addition of further halogen, as materials having good drying qualities and the like.

While we have described the preferred embodiments of our novel process of preparing esters of phosphorus acids, other modifications thereof can be made without departing from the scope and spirit of the invention, and we do not wish to limit our invention to the examples set forth herein except insofar as the same is defined by the following claims.

We claim:

1. A process for the preparation of esters of phosphorus acids comprising reacting a carbonic acid ester of a glycol with a trihalophosphorus compound.

2. The process of claim 1 wherein the carbonic acid ester is propylene carbonate.

3. The process of claim 1 wherein the trihalophosphorus compound is phosphorus trichloride.

4. A process for the preparation of tri($\beta$-chloropropyl)thionophosphate comprising reacting propylene carbonate with phosphorus trichloride and sulfur.

5. A process for the preparation of tri($\beta$-chloropropyl)-phosphite comprising reacting propylene carbonate with phosphorus trichloride.

6. A process for the preparation of tri($\beta$-chloropropyl)-phosphate comprising reacting propylene carbonate with phosphoryl chloride.

7. A process for the preparation of tri($\beta$-chloropropyl)-thionophosphate comprising reacting propylene carbonate with thiophosphoryl chloride.

References Cited in the file of this patent

UNITED STATES PATENTS

| | | |
|---|---|---|
| 2,169,185 | Shoemaker et al. | Aug. 8, 1939 |
| 2,394,829 | Whitehill et al. | Feb. 12, 1946 |
| 2,451,375 | Bell | Oct. 12, 1948 |
| 2,574,515 | Walter et al. | Nov. 13, 1951 |
| 2,574,518 | Walter et al. | Nov. 13, 1951 |
| 2,612,514 | Plueddemann | Sept. 30, 1952 |
| 2,661,365 | Gamrath | Dec. 1, 1953 |
| 2,661,366 | Gamrath | Dec. 1, 1953 |
| 2,744,128 | Morris et al. | May 1, 1956 |